(12) United States Patent
Tockert et al.

(10) Patent No.: US 9,169,525 B2
(45) Date of Patent: Oct. 27, 2015

(54) SYSTEM OF LEAKTIGHT CONNECTION BETWEEN A TUYERE AND A HOT BLAST INLET NOZZLE FOR A SHAFT FURNACE, AND STEEL-MAKING BLAST FURNACE COMPRISING SUCH A SYSTEM

(71) Applicant: PAUL WURTH S.A., Luxembourg (LU)

(72) Inventors: Paul Tockert, Berbourg (LU); Emile Lonardi, Bascharage (LU); Benoît Jung, Thionville (FR)

(73) Assignee: PAUL WURTH S.A., Luxembourg (LU)

( * ) Notice: Subject to any disclaimer, the term of this patent is extended or adjusted under 35 U.S.C. 154(b) by 0 days.

(21) Appl. No.: 14/356,757

(22) PCT Filed: Nov. 6, 2012

(86) PCT No.: PCT/EP2012/071901
§ 371 (c)(1),
(2) Date: May 7, 2014

(87) PCT Pub. No.: WO2013/068333
PCT Pub. Date: May 16, 2013

(65) Prior Publication Data
US 2015/0021837 A1    Jan. 22, 2015

(30) Foreign Application Priority Data

Nov. 9, 2011   (LU) .......................................... 91897

(51) Int. Cl.
*C21B 7/16*     (2006.01)
*F27B 1/16*     (2006.01)
*F16L 27/00*    (2006.01)
*F27D 99/00*    (2010.01)

(52) U.S. Cl.
CPC . *C21B 7/16* (2013.01); *C21B 7/163* (2013.01); *F16L 27/00* (2013.01); *F27B 1/16* (2013.01); *F27D 2099/0081* (2013.01)

(58) Field of Classification Search
CPC .................................. C21B 7/16; C21B 7/163
USPC ................................................... 266/265, 268
See application file for complete search history.

(56) References Cited

U.S. PATENT DOCUMENTS 3,545,736 A    12/1970 Zimmerman
4,023,832 A *   5/1977 Legille et al. .................. 285/41

(Continued)

FOREIGN PATENT DOCUMENTS

DE          103059 C    6/1898
DE          0618301     6/1898

(Continued)

OTHER PUBLICATIONS

International Preliminary Report on Patentability issued Feb. 18, 2014; re: PCT/EP2012/071901; citing: U.S. Pat. No. 3,545,736 A, EP 0 618 301 A and DE 103 059 C.

(Continued)

*Primary Examiner* — Scott Kastler
(74) *Attorney, Agent, or Firm* — Cantor Colburn LLP

(57) ABSTRACT

The sealed connection system between a tuyere of a shaft furnace, such as a steelmaking blast furnace, and an air blast pipe, in which a tip of the blast pipe is pressed towards a rear end of the tuyere, being centered thereon while still retaining freedom of pivoting movement relative thereto, including an added annular blast pipe seat, placed between the tip of the blast pipe and tuyere and immobile relative to the tuyere, the blast pipe tip resting against a rear face of the seat and an immobile gasket being placed between the seat and the tuyere such that the seat rests in sealed manner against a rear face of the tuyere, and a sleeve arranged around the contact zone between the blast pipe tip and the seat, is connected in sealed manner to the seat and to the blast pipe.

10 Claims, 5 Drawing Sheets

(56) References Cited

U.S. PATENT DOCUMENTS 5,119,743 A * 6/1992 Mailliet et al. ............ 110/182.5
5,209,657 A * 5/1993 Benck et al. .................. 432/99

FOREIGN PATENT DOCUMENTS

EP 0453739 10/1991
EP 0618301 10/1994

OTHER PUBLICATIONS

International Search Report for corresponding application PCT/EP2012/071901 filed Nov. 6, 2012: Mail date Nov. 27, 2012.
Chinese Office Action issued Dec. 8, 2014 re: Chinese Application No. 2012800553687; citing: Jin Guofan et al. "Application of Bellows"; U.S. Pat. No. 3545736 A.
Jin Guofan et al. "Application of Bellows Compensator in Blast Furnace and Hot Blast Heater", Aug. 1983; No. 4, pp. 29-34.

* cited by examiner

SYSTEM OF LEAKTIGHT CONNECTION BETWEEN A TUYERE AND A HOT BLAST INLET NOZZLE FOR A SHAFT FURNACE, AND STEEL-MAKING BLAST FURNACE COMPRISING SUCH A SYSTEM

FIELD OF THE INVENTION

The present invention relates to a sealed connection system between a tuyere and a hot air blast pipe for shaft furnace, such as a steelmaking blast furnace. It also relates to a steelmaking blast furnace comprising such a system.

BACKGROUND OF THE INVENTION

Preheated air is conventionally injected into a shaft furnace by means of an assembly, known as the tuyere stock, which provides a connection between the hot air bustle pipe and a tuyere, installed in the furnace wall, which opens into the furnace shaft. Typically, as shown in FIG. 1, the tuyere stock 10 is made up of a number of separate elements each comprising an external metal sheath and an internal refractory lining.

The tuyere stock 10 comprises
a downpipe 11 extending obliquely downwards from a hot air bustle pipe 1,
an elbow 12
a blast pipe 3, having a substantially horizontal axis, attached rigidly to the elbow, the front end of the blast pipe being held in contact with the rear end of the tuyere 4.

The copper tuyere 4, cooled by internal water circulation, is fitted in a tuyere holder, or tuyere cooler, 42 attached to the metal wall 21 of the blast furnace and extending through the internal refractory lining 22 of this wall.

The blast pipe 3 comprises an external wall 31 of steel, internally lined with a refractory material 32. As shown in FIGS. 2 and 3, the external wall extends towards the front end, or tip, 33 of the blast pipe to form spherically shaped wall resting swivellably against a frustoconical wall 41 formed on the rear end of the tuyere 4.

The tuyere stock is supported on the external metal wall 21 of the furnace by articulated tie rods, such as the upper tie rod 23 and lateral tie rods 24, the latter holding the blast pipe against the tuyere. These tie rods provide the tuyere stock assembly with a certain freedom of movement in order to absorb the thermal deformations, both of the furnace wall and of the various elements of the tuyere stock, which inevitably arise from fluctuations in temperature.

In order to provide a seal between the various elements despite the above-mentioned deformations, it is known to use bellows compensating systems 13 which make it possible to absorb relative motion, whether involving axial displacement or pivoting, at the connection between two elements, while still maintaining a seal, the tie rods providing a mechanical connection between the elements joined by the bellows compensators. Such compensator systems are described for example in EP 0 453 739, and are typically used to provide a seal between the bustle pipe and tuyere stock and may also be used between the air downpipe and the elbow to which blast pipe is attached.

Such compensator systems are all the more useful for providing the tuyere stock a certain ability to deform given that it is furthermore necessary to provide the best possible seal at the joint between the tip of the blast pipe and the tuyere, just where such systems cannot be used in particular due to the configuration in the environment of the joint, located in the thickness of the refractory wall of the furnace. This joint is thus provided simply by the tip of the blast pipe resting in centered manner against the rear end of the tuyere solely under the action of the forces arising from the weight of the tuyere stock and the tension exerted by the articulated tie rods 24 connecting the tuyere stock to the external metal wall of the furnace. In order to permit thermal deformation which might bring about an angular offset between the blast pipe and the tuyere, the blast pipe tip has a convex spherical surface in contact with a corresponding frustoconical or convex surface formed on the rear end of the tuyere. The spherical surface of the tip of the blast pipe is formed by the end of the external steel wall of the blast pipe. The tuyere is conventionally made of copper.

This arrangement, forming a ball joint connection between the blast pipe and tuyere, makes it possible to ensure centering of the blast pipe on the tuyere simply by the former resting against the latter and the metal-on-metal contact between the steel of the blast pipe and the copper of the tuyere makes it possible, during relative angular displacement thereof, to maintain a substantially linear contact between them and therefore a certain level of seal between blast pipe and tuyere.

U.S. Pat. No. 3,545,736 also discloses a system wherein an annular space is provided between a tubular metal jacket and the refractory part of the blast pipe. The jacket comprises a first end placed against the tuyere and capable of pivoting thereagainst, and is pressed against the tuyere by the elbow of the tuyere stock which itself rests in sealed manner against the second end of the jacket. The object of this arrangement is to limit the temperature difference between the outside and inside of the refractory part of the blast pipe by allowing hot gases to get into the annular space via an axial spacing maintained between the elbow of the tuyere stock and the blast pipe. In this system too, a certain degree of sealing may be obtained between the first end of the jacket and the tuyere when they undergo relative angular displacement.

However, just as when the refractory blast pipe is pressed directly against the tuyere, it is not possible for a perfect seal to be provided. Consequently, limited leaks of blast air are currently accepted insofar as said hot blast air is only oxygen-enriched air. However, when implementing more recent flue gas recirculation techniques, this gas is reinjected with the hot blast air. This flue gas is in fact very hazardous and even minimal levels of such leaks consequently cannot be permitted. Even in conventional blast furnaces, there is nowadays a desire to reduce hot blast air leaks for reasons of better safety.

BRIEF SUMMARY

The invention therefore solves the problem of the inadequate seal which may exist between the blast pipe and tuyere of a shaft furnace. The invention further provides a novel sealed connection system between the blast pipe and the tuyere, suited to the limited space available in the zone surrounding the joint between blast pipe and tuyere, which does not cause any additional stresses during installation of the tuyere stock nor any changes to the support and attachment means for the tuyere stock.

In the light of these aims, the invention provides a sealed connection system between a tuyere of a shaft furnace, such as a steelmaking blast furnace, and a blast pipe, wherein a blast pipe tip is pressed towards a rear end of the tuyere, being centered thereon while still retaining freedom of pivoting movement relative thereto. According to the invention, this system comprises an added annular blast pipe seat, placed between the tip of the blast pipe and tuyere and immobile relative to said tuyere, the blast pipe tip resting against a rear face of the seat and an immobile gasket being placed between the seat and the tuyere such that the seat rests in sealed manner against a rear face of the tuyere, and a deformable sealing sleeve arranged around the contact zone between the blast pipe tip and the seat, is connected in sealed manner, on the one hand, to the seat and, on the other hand, to the blast pipe.

In order to solve the above-mentioned problem, the present invention proposes providing, on the one hand, a supplemental seal between the blast pipe and the seat thereof, the latter two being capable of pivoting relative to one another, by means of a deformable sealing sleeve, and, on the other hand, a seal between the blast pipe seat and the tuyere, it being possible to create said seal thanks to the blast pipe seat being immobile relative to the tuyere.

Preferably, an annular groove is formed on the front face of the seat and a sealing gasket is placed in said groove, so as to be pressed against the rear face of the tuyere when the blast pipe is in turn pressed against its seat by the known prior art means connecting the tuyere stock to the external metal wall of the furnace. According to another particular arrangement, the seat is accommodated and centered in a receptacle provided on the rear part of the tuyere, and the front face of the seat rests against a planar rear face of the tuyere constituted by the bottom wall of said receptacle.

The blast pipe seat is preferably made of steel. The rear face of the seat in contact with the blast pipe may have a conical surface, or a concave surface which substantially matches the shape of the convex surface of the blast pipe tip. In this manner, centering of the blast pipe relative to the seat thereof, and therefore relative to the tuyere, is ensured, and the blast pipe resting on the seat thereof also contributes to the seal, in a similar manner to the direct contact between blast pipe and tuyere of the prior art, but said seal then, in accordance with the present invention, being enhanced by the sealing sleeve.

The sealing sleeve is preferably a bellows compensator, one end of which is attached in sealed manner, for example by welding, to the blast pipe seat. The other end of the compensator is attached in sealed manner, likewise by welding, directly to the external metal wall of the blast pipe, or to a flange added to said metal wall. Even if the blast pipe tip and the seat were to move apart, the seal between them would be retained.

The invention also provides a steelmaking blast furnace comprising a plurality of tuyeres and a plurality of tuyere stocks each comprising a blast pipe associated with a tuyere by a connection system as defined above. The system according to the invention is in particular intended for blast furnaces comprising a system for supplying fuel gases or recirculated gases or flue gases to the tuyeres. It may also be used on shaft furnaces of conventional design.

BRIEF DESCRIPTION OF THE DRAWINGS

Other distinctive features and characteristics of the invention will be revealed by the detailed description of two embodiments given below by way of example, with reference to the appended drawings, in which.

DETAILED DESCRIPTION

Figure 1:
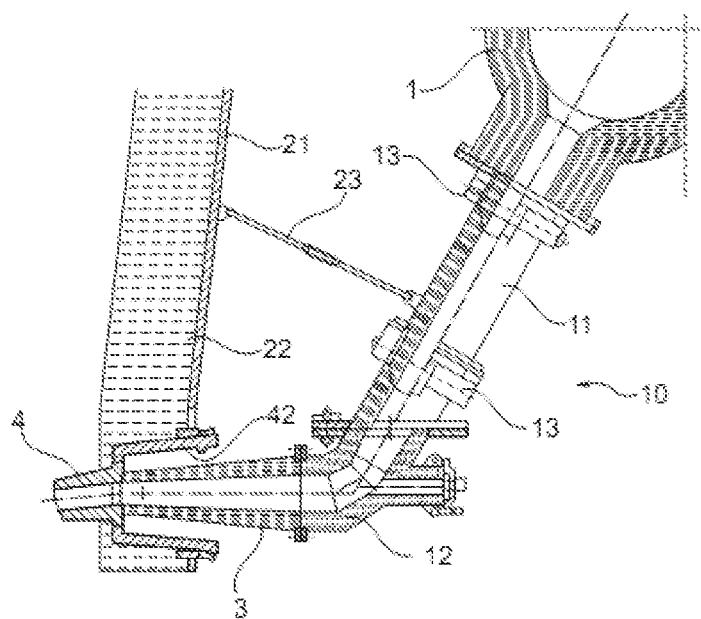
FIG. 1: is an overall sectional view of a tuyere stock, according to the prior art, in position on the wall of a blast furnace.
Figure 2:
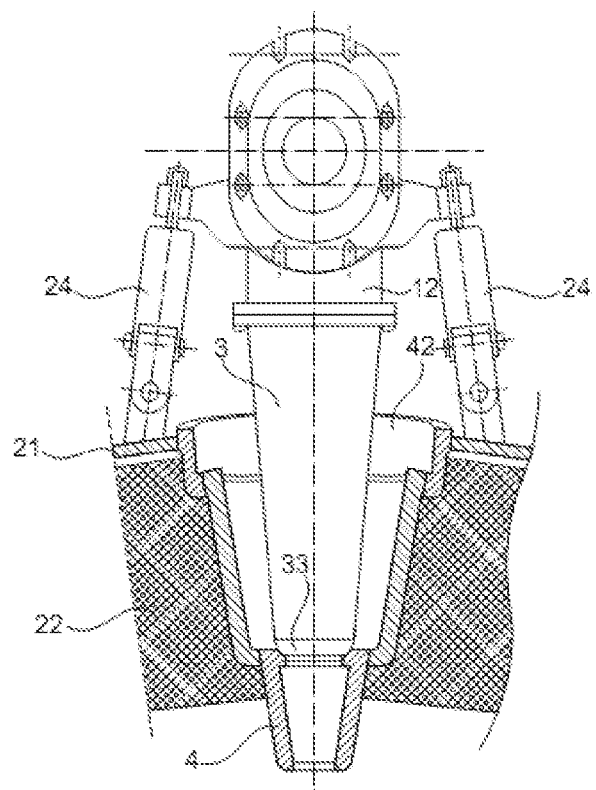
FIG. 2: is a partial top view of the tuyere stock in particular showing how the blast pipe is held against the tuyere, according to the prior art, by means of lateral tie rods.
Figure 3:
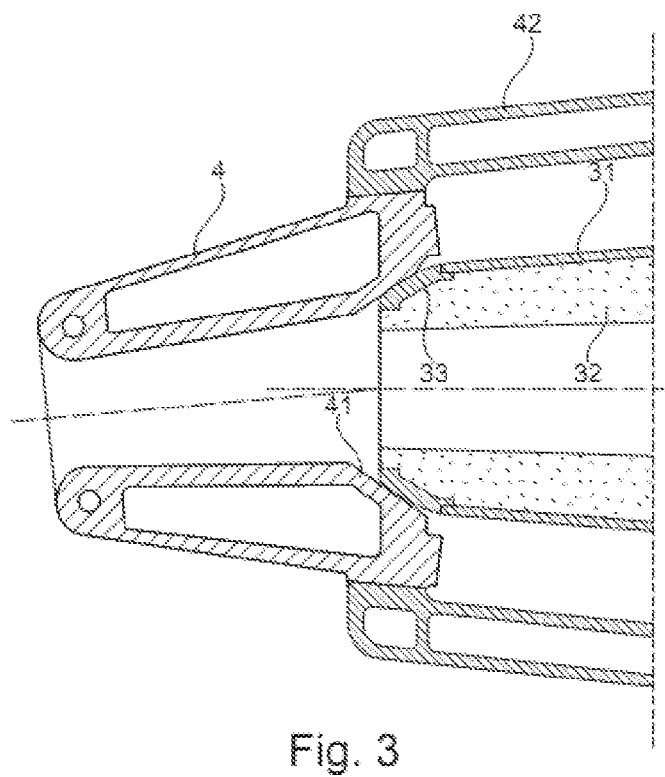
FIG. 3: is a detail sectional view of the contact zone between blast pipe and tuyere according to the prior art.

Comments have already been made regarding FIGS. 1 to 3, which show the prior art.

Figure 4:
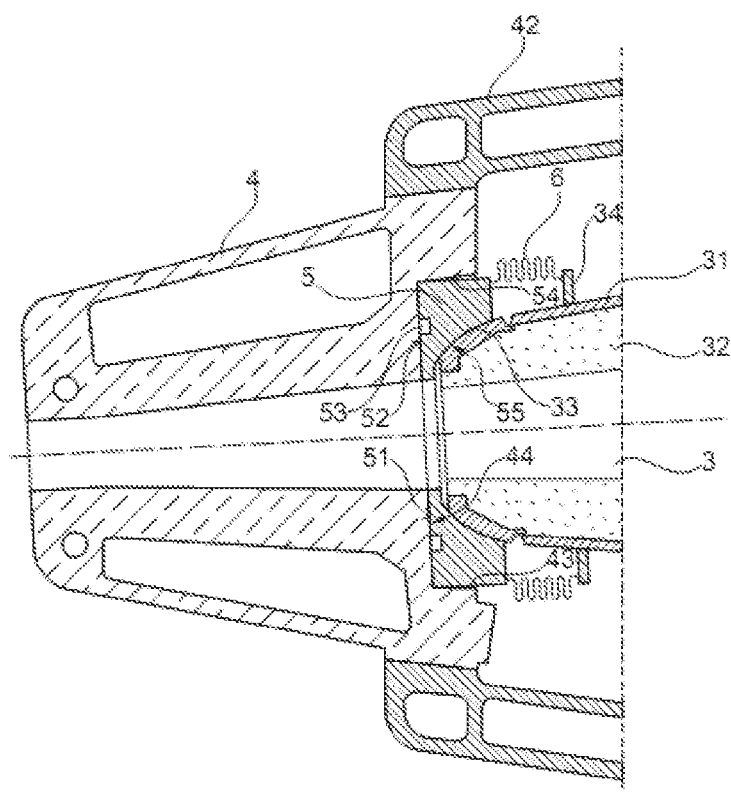
FIG. 4: is a sectional view of the connection zone between blast pipe and tuyere according to a first embodiment of the invention.

FIG. 4 shows a first embodiment of the invention which is characterized by the presence of a blast pipe seat 5 located between the tip 33 of the blast pipe and the tuyere 4. The blast pipe seat is an annular steel part, located in a cylindrical receptacle 43 provided on the rear end of the tuyere 4, and axially centered with the tuyere.

A circular groove 52 is provided in the front face 51 of the seat, and receives a gasket 53, intended to provide a seal between the seat and the tuyere.

The blast pipe seat 5 comprises on the rear face 54 thereof, on the blast pipe side, a concave spheroidal surface 55, corresponding to the convex surface of the tip of the blast pipe 33, so as to allow the blast pipe and seat to pivot relative to one another while maintaining the best possible seal contact between said elements.

A bellows compensator 6 is mounted in sealed manner between the rear face 54 of the seat and a flange 34 integral with the metal wall 31 of the blast pipe and connected thereto in likewise sealed manner, typically by welding. The bellows compensator is made of steel, preferably of stainless steel. The bellows compensator is typically also attached by the ends thereof being welded to the seat and to the flange respectively. It may incidentally be noted that, as a consequence, the blast pipe and the seat thereof may be preassembled prior to final installation of the assembly by inserting the blast pipe seat into the tuyere receptacle 43. The blast pipe seat bearing the sealing gasket together with the bellows compensator may, if necessary, be replaced as a wear part.

When the blast pipe is pressed towards the tuyere, as indicated previously for the prior art systems, the front face 51 of the blast pipe seat rests against the planar rear face 44 forming the bottom of the receptacle 43, and a seal is provided between said seat and the tuyere by the gasket 53. The sealing gasket 53 need not necessarily be made from a material resistant to elevated temperatures since, in known manner, the tuyere is cooled with water. This gasket may for example be a toroidal silicone gasket or a spiral-wound stainless steel-graphite gasket.

Figure 5:
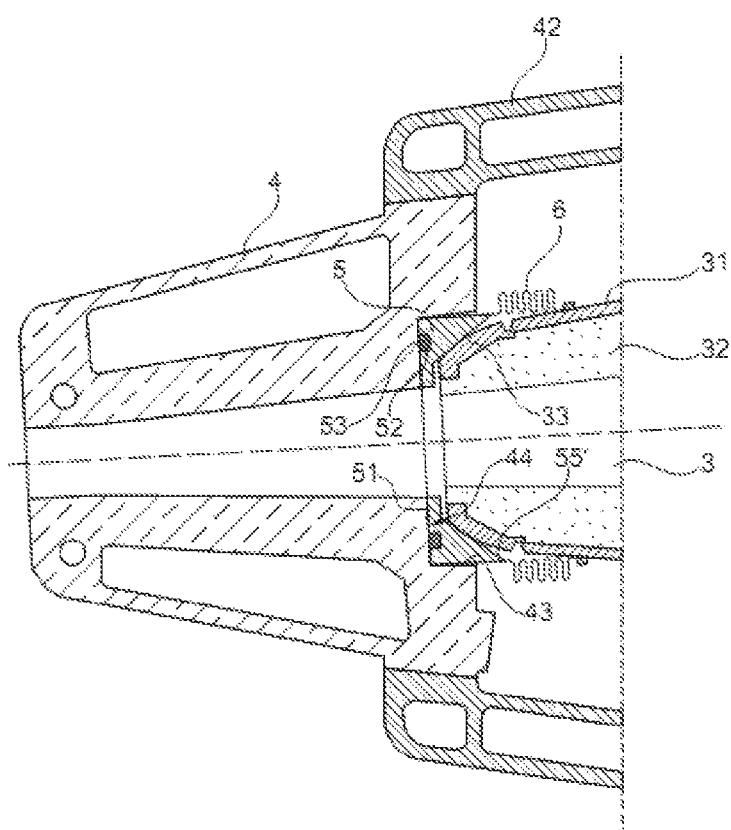
FIG. 5: is a sectional view of the connection zone between blast pipe and tuyere according to a second embodiment of the invention.

FIG. 5 shows a variant embodiment of the system. In this variant, the surface 55' of the blast pipe seat on which blast pipe tip 33 rests is a frustoconical surface, and the bellows compensator 6 is attached by being welded directly to the metal wall 31 of the blast pipe.

The invention claimed is:

1. A sealed connection system between a tuyere of a shaft furnace, such as a steelmaking blast furnace, and an air blast pipe, in which a tip of the blast pipe is pressed towards a rear end of the tuyere, being centered thereon while still retaining freedom of pivoting movement relative thereto, the system comprising:

an added annular blast pipe seat, placed between the tip of the blast pipe and tuyere and immobile relative to said tuyere, the blast pipe tip resting against a rear face of the seat and an immobile gasket being placed between the seat and the tuyere such that the seat rests in sealed manner against a rear face of the tuyere, wherein the seat further includes a front face resting against a planar rear face of the tuyere and an annular groove is formed on the front face and the sealing gasket is placed in the groove, and a deformable sealing sleeve, arranged around a contact zone between the blast pipe tip and the seat, the sleeve being a bellows compensator, one end of which is attached in sealed manner to the blast pipe seat, another end being attached in sealed manner to an external wall of the blast pipe.

2. A connection system according to claim 1, wherein the seat is located and centered in a receptacle provided on a rear part of the tuyere.

3. A connection system according to claim 1, wherein the seat is made of steel.

4. A connection system according to claim 1, wherein the rear face of the seat in contact with the blast pipe has a conical surface.

5. A connection system according to claim 1, wherein the rear face of the seat in contact with the blast pipe has a concave spherical surface which matches a spherical convex surface of the tip of the blast pipe.

6. A connection system according to claim 1, wherein the sleeve is attached in sealed manner by welding to the seat of the blast pipe.

7. A connection system according to claim 1, wherein the sleeve is attached in sealed manner by welding to an external metal wall of the blast pipe.

8. A connection system according to claim 1, wherein the sleeve is attached in sealed manner by welding to a flange added to an external metal wall of the blast pipe.

9. A steelmaking blast furnace comprising a plurality of tuyeres and a plurality of corresponding tuyere stocks each comprising a blast pipe associated with a tuyere by a connection system according to claim 1.

10. A steelmaking blast furnace according to claim 9, comprising a system for supplying fuel gases or recirculated gases to the tuyeres.

* * * * *